UNITED STATES PATENT OFFICE.

RICHARD SHARP, OF PITTSBURG, PENNSYLVANIA.

IMPROVEMENT IN COMPOSITION FILLINGS FOR PAINTERS.

Specification forming part of Letters Patent No. 141,518, dated August 5, 1873; application filed June 14, 1873.

*To all whom it may concern:*

Be it known that I, RICHARD SHARP, of Pittsburg, in the county of Allegheny and State of Pennsylvania, have invented a new and Improved Composition Filling for Painters; and I do hereby declare that the following is a full, clear, and exact description of the same.

The object of my invention is to provide for carriage-manufacturers an improved "painters' rough-stuff," which is put on after the paint and leaves a smooth and solid surface after rubbing. My rough-stuff consists of a mixture of pulverized pumice-stone and white lead, thinned by coach-maker's japan and rubbing-varnish, prepared in the following proportions and manner:

Twenty-five pounds of pulverized pumice-stone are mixed with five pounds of white lead in oil, which mixture is thinned suitably for use by the addition of a mixture of two parts of coach-japan with one part of rubbing-varnish. If the varnish mixture is too thick add some turpentine.

The wood is first filled with from three to five coats of keg lead, and then coated with this surface-protector, which causes the work to take a fine polish.

Having thus described my invention, what I claim as new, and desire to secure by Letters Patent, is—

A rough-stuff compound to follow paint, formed of pumice-stone, applied in connection with white lead, japan, and varnish, as described.

RICHARD SHARP.

Witnesses:
 JOHN HARE,
 ROBERT W. HARE.